US012694295B2

(12) United States Patent
Desai et al.

(10) Patent No.: US 12,694,295 B2
(45) Date of Patent: Jul. 28, 2026

(54) VARIATIONAL AUTO-ENCODER FOR MULTIVARIATE TIME SERIES GENERATION

(71) Applicant: Verint Americas Inc., Alpharetta, GA (US)

(72) Inventors: Abhyuday Desai, San Diego, CA (US); Ian Beaver, Spokane, WA (US)

(73) Assignee: VERINT AMERICAS INC., Alpharetta, GA (US)

( * ) Notice: Subject to any disclaimer, the term of this patent is extended or adjusted under 35 U.S.C. 154(b) by 979 days.

(21) Appl. No.: 17/952,036

(22) Filed: Sep. 23, 2022

(65) Prior Publication Data

US 2023/0128164 A1    Apr. 27, 2023

Related U.S. Application Data

(60) Provisional application No. 63/248,606, filed on Sep. 27, 2021.

(51) Int. Cl.
*G06N 3/084* (2023.01)

(52) U.S. Cl.
CPC .................................... *G06N 3/084* (2013.01)

(58) Field of Classification Search
CPC .... G06N 3/0455; G06N 3/0464; G06N 3/047; G06N 3/0475; G06N 3/048; G06N 3/084
See application file for complete search history.

(56) References Cited

U.S. PATENT DOCUMENTS

2021/0065006 A1* 3/2021 Bade .................... G06N 3/0475

OTHER PUBLICATIONS

Klopries et al., "ITF-VAE: Variational Auto-Encoder using interpretable continuous time series features", Sep. 2020, Journal of Latex Class Files, vol. 18, No. 9, pp. 1-11. (Year: 2020).*
Oreshkin et al., "N-Beats: Neural Basis Expansion Analysis for Interpretable Time Series Forecasting", Feb. 20, 2020, arXiv:1905. 10437v4, pp. 1-31. (Year: 2020).*
S. Beiden, M. Maloof, and R. F. Wagner. A general model for finite-sample effects in training and testing of competing classifiers. IEEE Transactions on pattern analysis and machine intelligence, 25(12):1561-1569, 2003.

(Continued)

*Primary Examiner* — Brent Johnston Hoover
(74) *Attorney, Agent, or Firm* — Dinsmore & Shohl LLP

(57) ABSTRACT

Certain aspects of the present disclosure provide techniques for generating multivariate time series data utilizing a variational auto-encoder (VAE) having an architecture for injecting custom temporal structures into the generated multivariate time series data. A method for generating multivariate time series data includes sampling a multivariate distribution forming a latent space vector, processing the latent space vector with an interpretable decoder of a variational auto-encoder, an architecture of the interpretable decoder comprising a plurality of blocks including one or more blocks configured to inject one or more temporal structures into multivariate time series data, and outputting, from the interpretable decoder, generated multivariate time series data comprising one or more temporal structures defined by the injected one or more temporal structures.

20 Claims, 6 Drawing Sheets

(56) References Cited

OTHER PUBLICATIONS

C. Esteban, S. L. Hyland, and G. Ratsch. Real-valued (medical) time series generation with recurrent conditional gans. arXiv preprint arXiv:1706.02633, 2017.

O. Fabius and J. R. Van Amersfoort. Variational recurrent auto-encoders. arXiv preprint arXiv:1412.6581, 2014.

C. P. Gomes, A. Sabharwal, and B. Selman. Near-uniform sampling of combinatorial spaces using xor constraints. In NIPS, pp. 481-488, 2006.

D. P. Kingma and M. Welling. Auto-encoding variational bayes. arXiv preprint arXiv:1312.6114, 2013.

O. Mogren. C-mn-gan: Continuous recurrent neural networks with adversarial training. arXiv preprint arXiv:1611.09904, 2016.

B. N. Oreshkin, D. Carpov, N. Chapados, and Y. Bengio. N-beats: Neural basis expansion analysis for interpretable time series forecasting. arXiv preprint arXiv:1905.10437, 2019.

A. Radford, J. Wu, R. Child, D. Luan, D. Amodei, I. Sutskever, et al. Language models are unsupervised multitask learners. OpenAI blog, 1(8):9, 2019.

A. Srivastava, L. Valkov, C. Russell, M. U. Gutmann, and C. Sutton. Veegan: Reducing mode collapse in gans using implicit variational learning. In Proceedings of the 31st International Conference on Neural Information Processing Systems, pp. 3310-3320, 2017.

J. Yoon, D. Jarrett, and M. van der Schaar. Time-series generative adversarial networks. In Proceedings of the 33rd International Conference on Neural Information Processing Systems, pp. 5508-5518, 2019.

M. Fraccaro, S. K Sønderby, U. Paquet, and O. Winther. Sequential neural models with stochastic layers. arXiv preprint arXiv:1605.07571, 2016.

Office Action issued by Israeli Patent Office dated Dec. 12, 2024 (4 pages).

Klopries, Hendrik et al., "ITF-VAE: Variational Auto-Encoder Using Interpretable Continuous Times Series Features", Journal of Latex Class Files, vol. 18, No. 9, Sep. 2020; Automation Technology and Learning Systems, South Wesphalia University of Applied Sciences, Soest, Germany (12 pages).

Extended European Search Report for European Patent Application No. 22197998.2, dated Feb. 22, 2023, 12 pages.

Li, Longyuan et al.: "Anomaly Detection of Time Series with Smoothness-Inducing Sequential Variational Auto-Encoder", IEEE Transactions on Neural Networks and Learning Systems, IEEE, USA, vol. 32, No. 3, Apr. 13, 2020 (Apr. 13, 2020), 15 pages.

Asperti, Andrea et al.: "A Survey on Variational Autoencoders from a Green AI Perspective", SN Computer Science, vol. 2, No. 4., May 27, 2021 (May 27, 2021), 23 pages.

Gu, Jiuxiang et al.: "Recent Advances in Convolutional Neural Networks", Pattern Recognition, Elsevier, GB, vol. 77, Oct. 11, 2017 (Oct. 11, 2017), 38 pages.

* cited by examiner

200

SAMPLE MULTIVARIATE TIME
SERIES DATA                          210

PROCESS THE LATENT SPACE
VECTOR WITH DECODER OF
TIMEVAE                              220

OUTPUT, FROM THE DECODER,
GENERATED MULTIVARIATE TIME
SERIES DATA                          230

300

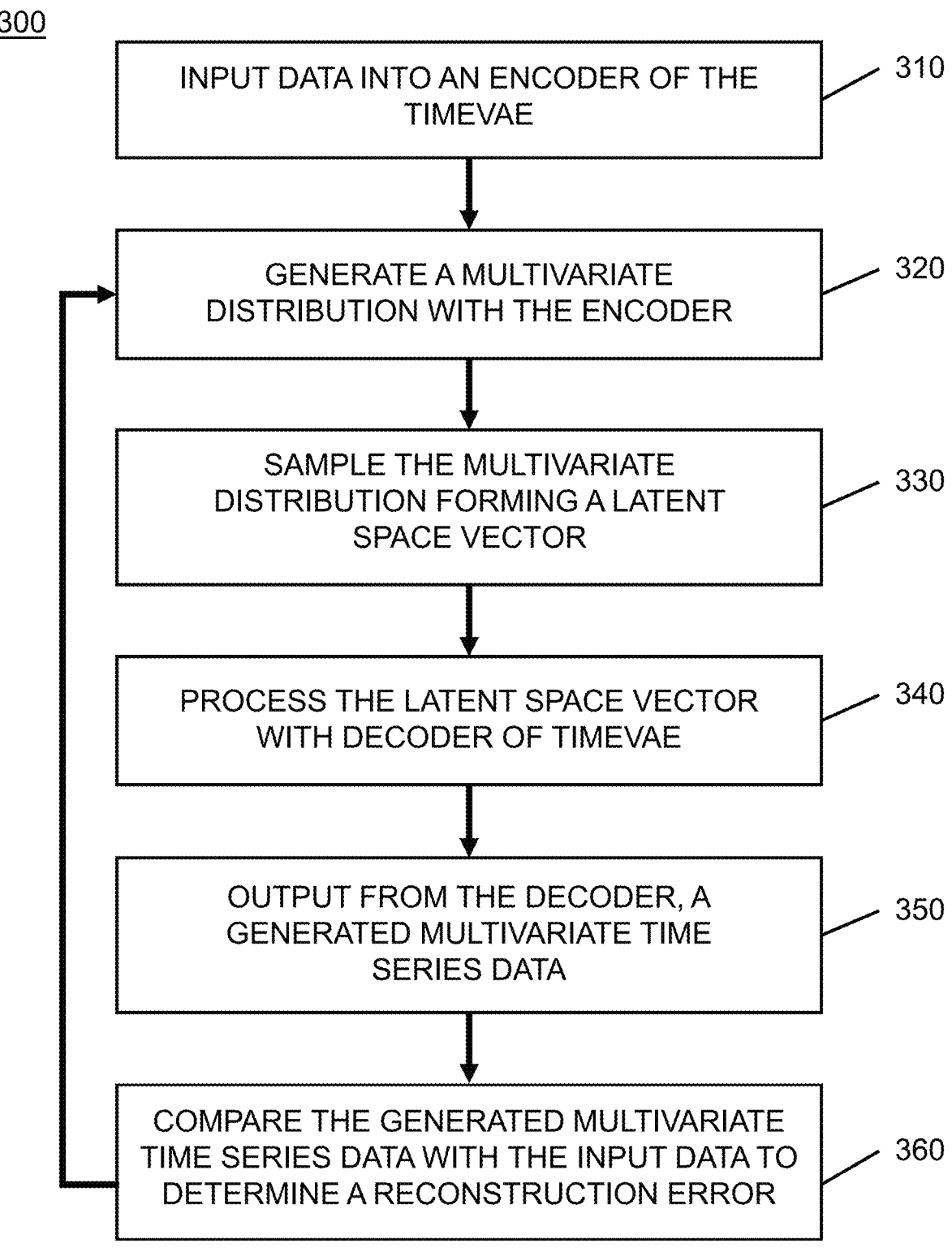

INPUT DATA INTO AN ENCODER OF THE TIMEVAE — 310

GENERATE A MULTIVARIATE DISTRIBUTION WITH THE ENCODER — 320

SAMPLE THE MULTIVARIATE DISTRIBUTION FORMING A LATENT SPACE VECTOR — 330

PROCESS THE LATENT SPACE VECTOR WITH DECODER OF TIMEVAE — 340

OUTPUT FROM THE DECODER, A GENERATED MULTIVARIATE TIME SERIES DATA — 350

COMPARE THE GENERATED MULTIVARIATE TIME SERIES DATA WITH THE INPUT DATA TO DETERMINE A RECONSTRUCTION ERROR — 360

FIG. 5

VARIATIONAL AUTO-ENCODER FOR MULTIVARIATE TIME SERIES GENERATION

CROSS-REFERENCE TO RELATED APPLICATIONS

This application claims priority to U.S. Provisional Application No. 63/248,606, filed Sep. 27, 2021, the entirety of which is hereby incorporated by reference.

INTRODUCTION

Technical Field

The present specification relates to systems and methods for generating multivariate time series data and, more specifically, to systems and methods that utilize a variational auto-encoder (VAE) having an architecture for injecting custom temporal structures into the generated multivariate time series data.

BACKGROUND

Data analytics are increasingly valuable for making predictions and informed decisions. Data analytics has seen an increase in the utilization of specialized systems and software to find trends in data and draw conclusions and/or make predictions about the analyzed information. For example, tasks such as product supply, demand, and pricing leverage data analytics to assist in making business decisions. Other fields, such as finance, utilize an understanding of trends and behaviors to make predictions, for example, regarding the stock market. Furthermore, the field of meteorology utilizes past real weather data for weather forecasting models to generate time series predictions for weather events. As a further example, customer center call volume, customer service representative availability, and intelligent virtual assistant success rates for customer satisfaction generate data to predict the performance of a customer service function. Making an accurate prediction as to the behavior of stock for a company following an initial public offering may rely on the analysis of complex and multivariate data. Many of the specialized systems and software are enabled by deep learning models trained to identify patterns and provide interpretable outputs. However, training and configuring these deep learning models is a technically complex task that requires significant compute resources and is generally impossible to perform in the human mind.

Accordingly, a need exists for improved systems and methods for generating multivariate time series data that perform equal to or better than current generative models in generating realistic but synthetic data, is computationally efficient to train, outperforms available methods on the next-step prediction task, and is superior to existing models as the size of available real-world training data decreases.

SUMMARY

In embodiments, a method for generating multivariate time series data includes sampling a multivariate distribution forming a latent space vector, processing the latent space vector with an interpretable decoder of a variational auto-encoder, an architecture of the interpretable decoder comprising a plurality of blocks including one or more blocks configured to inject one or more temporal structures into multivariate time series data; and outputting, from the interpretable decoder, generated multivariate time series data comprising one or more temporal structures defined by the injected one or more temporal structures.

In some embodiments, a computer-implemented system for generating multivariate time series data includes a processor and a non-transitory computer-readable medium storing computer readable instructions that, when executed by the processor, cause the system to sample a multivariate distribution forming a latent space vector, process the latent space vector with an interpretable decoder of a variational auto-encoder, an architecture of the interpretable decoder comprising a plurality of blocks including one or more blocks configured to inject one or more temporal structures into a multivariate time series data, and output, from the interpretable decoder, generated multivariate time series data comprising one or more temporal structures defined by the injected one or more temporal structures.

In some embodiments, a method of training a variational auto-encoder for generating multivariate time series data includes inputting a plurality of data into an encoder of the variational auto-encoder, generating a multivariate distribution with the encoder, sampling the multivariate distribution forming a latent space vector, processing the latent space vector with an interpretable decoder of the variational auto-encoder, where an architecture of the interpretable decoder comprises a plurality of blocks including one or more trainable temporal blocks configured to learn temporal structures in the sampled multivariate distribution, outputting, from the interpretable decoder, a generated multivariate time series data, comparing the generated multivariate time series data with the plurality of data to determine a reconstruction error, and backpropagating the determined reconstruction error to update the variational auto-encoder.

These and additional features provided by the embodiments described herein will be more fully understood in view of the following detailed description, in conjunction with the drawings.

DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

FIG. 5 depicts an illustrative flowchart for an example method for training a TimeVAE according to one or more embodiments shown and described herein.

DETAILED DESCRIPTION

Figure 1:
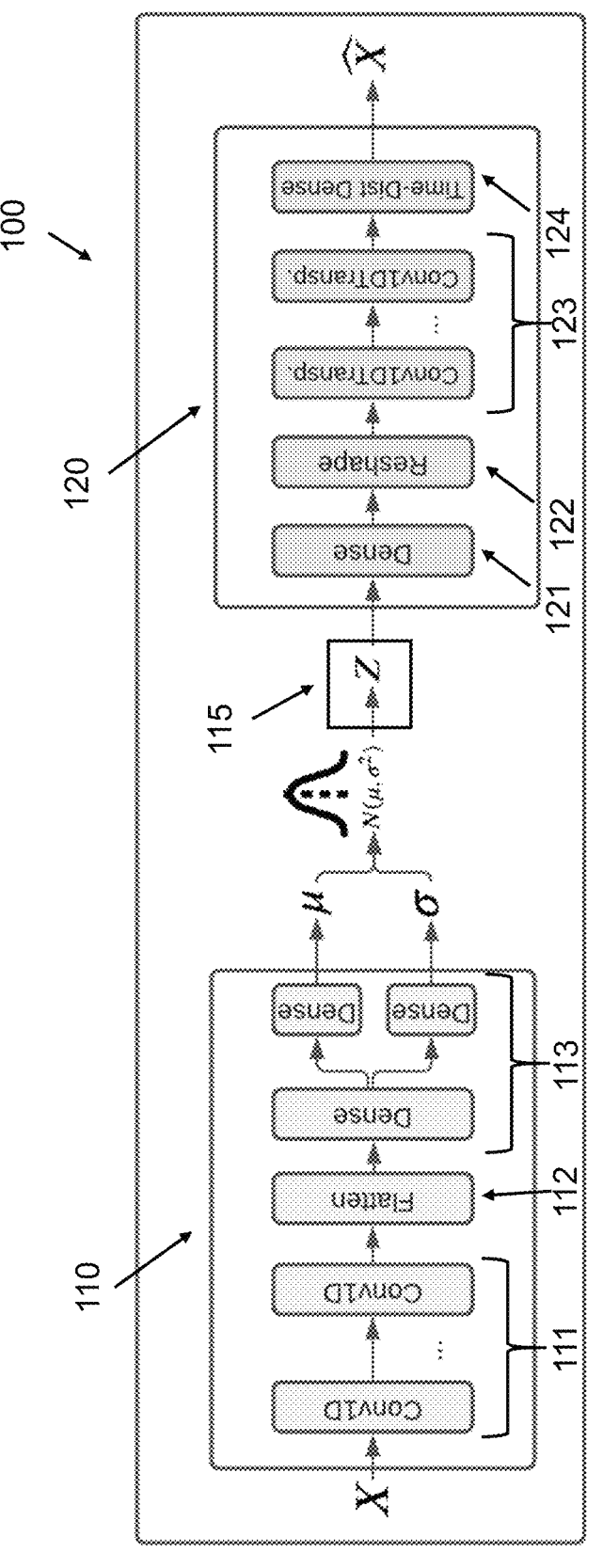
FIG. 1 depicts a block diagram of a base TimeVAE according to one or more embodiments shown and described herein.

Embodiments of the present disclosure include a novel Variational Auto-Encoder architecture for generating multivariate time series data, which is referred to herein as a "TimeVAE." The TimeVAE architecture and techniques described herein are directed to generating multivariate time series data (e.g., synthetic time series data) using a decoder architecture that includes blocks for learning and injecting temporal structures into generated multivariate time series data.

Generation of synthetic time series data is a technically challenging task due to the myriad different types of temporal patterns that may be characteristic of the data. The generative process must capture both the distributions in features as well as the temporal relationships. Deep learning models, such as generative adversarial networks (GANs), are well-suited for modeling such complex relationships. However, deep learning models, such as GANs, require large amounts of training data sets, and training times can be significantly long in order to learn to simulate real data, which requires significant investment in processing hardware and significant use of processing time, power, and other finite resources. Moreover, in many real-world cases involving time-series data, the amount of available data can be limited in terms of the number of samples or in length of history. For example, there is a limited amount of available time-series data for making stock market predictions involving companies soon after initial public offering or predicting a retail organization's staffing needs in newly opened locations. Such situations require a data generation method that functions well despite a low volume of available real-world data that also allows users to introduce specific constructs of time-series patterns that are known to exist in the specific use case.

Data generators are useful in scenarios, such as the aforementioned, where there is a lack of sufficient real data because data generators can generate synthetic data that resembles real-world data, which can then be used to train robust predictive models. Additionally, data generators are useful in scenarios where there are restrictions on data usage due to privacy reasons; there is a need to simulate situations not yet encountered in reality, simulating exceptional cases, or the need to create datasets for specific testing scenarios such as the presence of outliers or changepoints. Data generators also can help alleviate the limitation of deep-learning models that are data-hungry.

Some generative models use Monte Carlo sampling methods with user-defined distributions. While these methods may include some benefits over GAN based data generators, such as being simpler and more convenient to use, they are limited in their ability to generate data that accurately resembles real-world data.

Common limitations of the above-referenced generative models include difficulty in training because the trained model is commonly subject to mode collapse, e.g., learning to sample synthetic data without diversity. Other limitations are that models, such as TimeGAN and RCGAN methods, need more than a day to be trained with 5,000 epochs by a V100 GPU on larger datasets, and sufficient data to train the models is not easy to obtain for many real-world forecasting situations.

Embodiments of a TimeVAE, which will be described in more detail herein, include several distinct and beneficial properties compared to other deep learning data generators, such as GAN-based data generators. For example, embodiments of TimeVAEs are interpretable, have the ability to encode domain knowledge, and are capable of being trained in less time and on smaller amounts of data while maintaining and/or exceeding the performance of other data generation methods. This results in fewer computing resources being consumed during data generation and training as well as improved performance of models trained on the generated data. TimeVAEs are able to accurately represent the temporal attributes of original data, and on next-step prediction tasks using generated data and consistently exceed the performance of state-of-the-art data generation methods.

The aforementioned capabilities of TimeVAEs and those discussed in more detail herein are enabled by the unique architecture that TimeVAE employs. In general, embodiments of a TimeVAE include a variational auto-encoder having an architecture configured to learn and inject specific temporal structures in the data generation process. More specifically, the decoder of a TimeVAE may include a plurality of blocks, each representing different temporal structures that generate an output that is added together to produce a final output. The final output is a multivariate time series data having one or more temporal structures defined by the injected one or more temporal structures. The temporal structures may take many forms, including, for example, data sets including time series data sets that depict concept drift, trend, seasonality, and other data set behaviors. Concept drift, for example, implemented by a concept drift block, allows for the definition of normal for the time series signal (e.g., the multivariate time series data) to change over time, for example, through a mean shift or a shift in standard deviation, which is referred to as a context shift. Trend blocks generally model monotonic functions, and seasonality blocks generally model cyclical patterns over a period. The plurality of blocks may also include a base decoder block, which may also be referred to as a residual block. The temporal structures can be used to create an interpretable generative process and to inject domain expertise in cases where there is insufficient real-world data to train the generator model. The interpretability of a machine-learning model refers to the degree to which the model's results can be consistently predicted and understanding of why the model makes the decisions or predictions. In other words, an interpretable machine-learning model refers to methods and models that make the behavior and predictions of machine learning systems understandable to humans. Additionally, the term "domain expertise" as used herein refers to the application of expert knowledge or at least known information such as known seasonal patterns or trends that are expected in a data set or industry. For example, a weather person who has forecasted storm tracks or seasonal precipitation for a period of time may have obtained a level of domain expertise when it comes to defining seasonal patterns or trends in weather data.

Aspects of TimeVAEs are described herein in more detail with reference to the drawings. More specifically, the architecture of example TimeVAEs, methods for training TimeVAEs, and implementation examples using TimeVAEs as a data generator are described herein. The following describes the framework, systems, and methods in more detail with reference to the drawings where like numbers refer to like structures.

To enable an understanding of the embodiments of an interpretable TimeVAE, FIG. 1 depicts a block diagram of a base VAE 100 according to certain embodiments. The base VAE 100 has an architecture that includes an encoder 110, a decoder 120, and a loss function. The encoder 110 and decoder 120 may each be configured as neural networks, including convolutional neural networks. For example, the encoder 110 may be a neural network configured to learn an efficient compression of the data into a lower dimensional space. In probability model terms, the inference network parameterizes the approximate posterior of the latent variables z. The input dataset X includes N independent and identically distributed (i.i.d.) samples of some continuous or discrete variable x. The encoder 110 of the base VAE 100 outputs the distribution of the embedding instead of a point estimate as in a traditional Auto-Encoder. More specifically, encoder 110 outputs two vectors: a vector of means, $\mu$, and another vector of standard deviations, $\sigma$.

The value z is generated from some prior distribution $p_\theta(z)$ and the value x is generated from some conditional distribution $p_\theta(x|z)$. While true values of the prior $p_\theta(z)$ and the likelihood $p_\theta(x|z)$ are unknown, it is assumed that they are differentiable with respect to both $\sigma$ and z. Accordingly, the relationships between the input data and the latent representation being defined as follows: the prior is $p_\theta(z)$, the likelihood is $p_\theta(x|z)$, and the posterior is $p_\theta(z|x)$.

The computation of $p_\theta(z)$ is very expensive and often intractable, thus creating a technical problem in the art. To overcome this, the base VAE 100 introduces an approximation of the posterior distribution as follows: $g_\phi(z|x) \approx p_\theta(z|x)$. With this framework, the encoder 110 serves to model the probabilistic posterior distribution $g_\phi(z|x)$, while the decoder 120 serves to model the conditional likelihood $p_\theta(x|z)$.

In some embodiments, the prior distribution of z is chosen to be a Gaussian distribution, more specifically, a standard normal. The posterior is regularized during training to ensure that the latent space is wrapped around this prior. In embodiments, this is done by adding the Kullback-Leibler divergence (KL-divergence) between the variational approximation of the posterior and the chosen prior to the loss function.

Since the given inputs are embedded into a chosen prior, z can be directly sampled from the prior distribution, and then the sampled z is passed through the decoder 120. The decoder 120 reconstructs the data x given the sampled z. Following this approach, the VAE's decoder 120 is converted into a generative model.

Still referring to FIG. 1, the base VAE 100 includes a loss function. The loss function for the base VAE 100 (and TimeVAE 100' described herein) is referred to as an Evidence Lower Bound loss function (ELBO) and written as follows in Equation 1:

$$L_{\theta,\phi} = -E_{q_\phi(z|x)}[\log p_\theta(x|z)] + D_{KL}(q_\phi(z|x)\|p_\theta(z)) \qquad \text{Eq. 1}$$

The first term on the right hand side (RHS) is the negative log-likelihood that the data given z is sampled from $q_\theta(z|x)$. The second term on the RHS is the KL-Divergence loss between the encoded latent space distribution and the prior. One example process involves sampling z from $q_\theta(z|x)$, which would normally make the operation non-differentiable. However, VAE architecture implements a reparameterization trick, which makes the VAE end-to-end trainable.

It is noted that the base encoding and base decoding functions implemented by the encoder 110 and the decoder 120, respectively, may be chosen from any model as long as the loss function described hereinabove is differentiable. In some embodiments, the method uses a combination of traditional deep learning layers such as dense and convolutional layers and custom layers to model time-series specific components such as level, multi-polynomial trend, and seasonal patterns. As depicted in FIG. 1, a block diagram of the base version of VAE excludes the custom temporal structures.

Still referring to FIG. 1, the input signal X into the encoder 110 may be a 3-dimensional array of size N×T×D, where N is the batch size, T is the number of time steps, and D is the number of feature dimensions. For example, the input signal X may be multivariate data corresponding to stocks. Such data may include features dimensions such as price (e.g., including closing price, opening price, mean price, max price, volume for the day, and the like), time (e.g., daily prices), and samples (e.g., for various companies). Other examples of input signals X include weather data for weather forecasting, customer service center data, product sales data, energy usage data, energy supply, and pricing data, and the like. If given data has variable length sequences, then the sequences may be padded with zeroes at the beginning to ensure all sequences have the same length T.

The encoder 110 passes the inputs through a series of convolutional layers 111 with, in this example, ReLU activation, though other types of activations may be used in other embodiments. Next, a flattening layer 112 is implemented so that the data are flattened before passing through a fully-connected (dense) linear layer 113. If m is the number of chosen latent dimensions representing dimensions of the multivariate Gaussian $N(\mu, \sigma^2)$, then this last layer has 2m number of neurons. The output (e.g., two vectors: a vector of means, $\mu$, and another vector of standard deviations, $\sigma$) generated by the encoder 110 is used to parameterize the multivariate Gaussian $N(\mu, \sigma^2)$. The size of latent space m is a model hyper-parameter.

Next, a sampler 115 samples the vector z from the multivariate Gaussian $N(\mu, \sigma^2)$ using the reparameterization trick. The reparameterization trick is known in the art of variational auto-encoder as a way to write a normal distribution as a mean $\mu$ plus some standard deviation $\alpha$, multiplied by some error $\varepsilon$, that is, $z=\mu+\sigma^*\varepsilon$; $\varepsilon \sim N(0,1)$.

The decoder 120 receives the sampled latent vector z, which is of length m. It is passed through a fully-connected linear layer (e.g. a dense layer 121). Then, a reshaping layer 122 reshapes the data into a 3-dimensional array before passing through a series of transposed convolutional layers 123 with ReLU activation. Finally, the data passes through a time-distributed, fully connected layer 124 with dimensions such that the final output $\hat{X}$ shape is the same as the original signal X.

Figure 2:
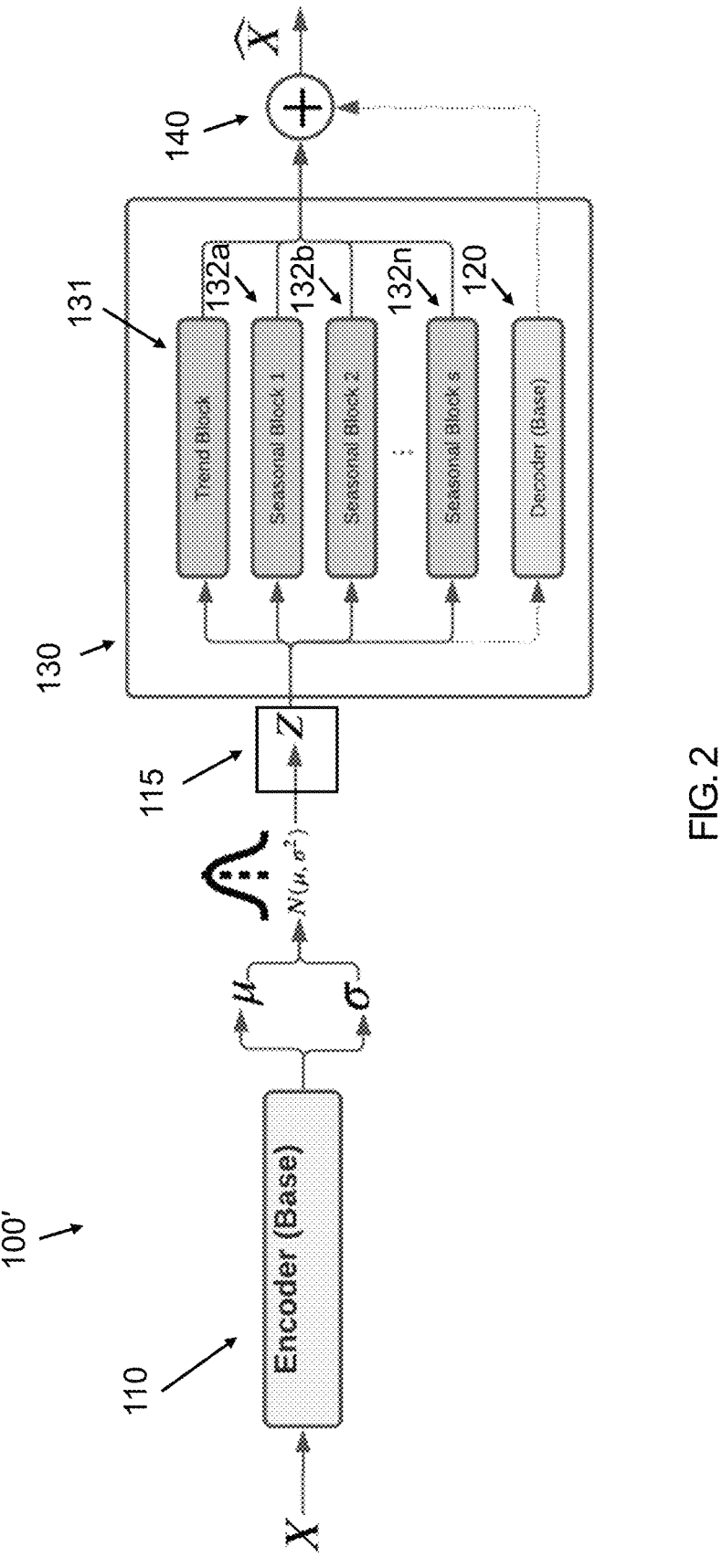
FIG. 2 depicts a block diagram of an interpretable Time-VAE according to one or more embodiments shown and described herein.

The architecture of base VAE 100 depicted and described with respect to FIG. 1 may be beneficially modified to be interpretable as described with respect to FIG. 2. As described further below, interpretability of the modeled data generation process is achieved by injecting temporal structures to the data generation process in the decoder 130 of TimeVAE 100'.

Interpretable TimeVAE with Temporal Structure Processing Blocks

The TimeVAE 100' depicted in FIG. 2 uses the same encoder 110 structure as that of the base VAE 100 depicted and described with reference to FIG. 1. However, the decoder 130 of TimeVAE 100' is modified to include a more complex architecture. In embodiments, the architecture of the decoder 130 includes a plurality of blocks 120, 131, 132a-132n, where one or more of the plurality of blocks is configured to learn and/or inject specific temporal structures into multivariate time series data generated by the decoding process. In some embodiments, the plurality of blocks 120, 131, 132a-132n, which may be referred to generally as temporal structure processing blocks, are configured in a parallel architecture where the outputs from each block 120, 131, 132a-132n are added (e.g., add operator 140) together to produce the final output. In some embodiments, one or more of the plurality of blocks 120, 131, 132a-132n may be configured in series with one or more other blocks and may include serial add operators. Referring, more specifically, to the plurality of blocks 120, 131, 132a-132n of the decoder 130, the blocks corresponding to different temporal structures and/or a base decoder block 120 as depicted and described with reference to FIG. 1. The blocks 131 and 132a-132n corresponding to temporal structure may include different types of temporal structure processing blocks. In this example, blocks 131 and 132a-132n include a trend block 131 and one or more seasonality blocks 132a-132n, which are examples of temporal structure processing blocks. In embodiments, the plurality of blocks 131 and 132a-132n corresponding to temporal structures include a trend block 131 and/or one or more seasonality blocks 132a-132n.

The trend block 131 and the one or more seasonality blocks 132a-132n are described in detail with reference to FIGS. 3A and 3B, respectively.

Figure 3B:
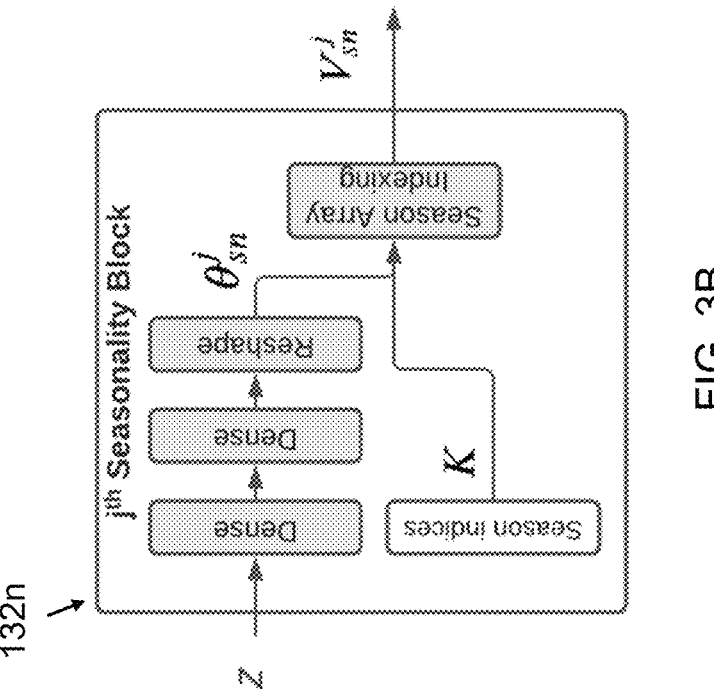
FIG. 3B depicts an illustrative block diagram of a seasonality block of a decoder of the interpretable TimeVAE according to one or more embodiments shown and described herein.
Figure 3A:
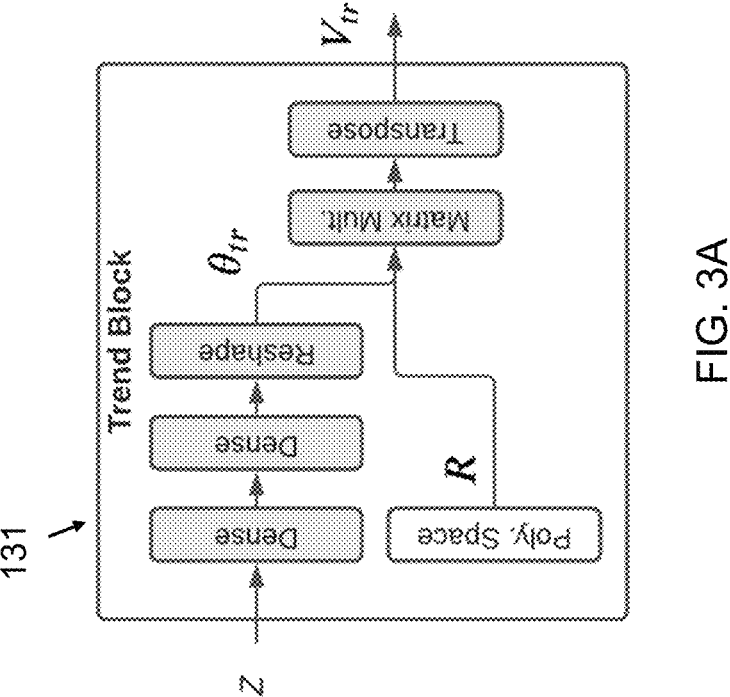
FIG. 3A depicts an illustrative block diagram of a trend block of a decoder of the interpretable TimeVAE according to one or more embodiments shown and described herein.

FIG. 3A depicts an illustrative block diagram of a trend block 131. In this example, trend block 131 defines a monotonic function. In embodiments, the trend block 131 receives the sampled vector z. For the following explanation, N refers to the batch size, D is the number of features, T is the number of time steps (e.g., number of epochs), and P is the number of degrees of polynomial specified by a user. The trend polynomials p=0, 1, 2 . . . P are modeled in a two-step process. First, the sampled latent space vector z is used to estimate the basis expansion coefficients $\theta_{tr}$ for a trend by utilizing one or more fully-connected (dense) linear layers and further reshaped. A reshaping operation configures $\theta_{tr}$ to have a dimensionality of N×D×P. Next, $\theta_{tr}$ is used to reconstruct the trend $V_{tr}$ in the original signal. The trend reconstruction in the signal in matrix form can be expressed as follows: $V_{tr}=\theta_{tr}R$, where $R=[1, r, \ldots, r^P]$ is the matrix of powers of r and where r=[0, 1, 2, . . . , T−1]/T is a time vector. R has a dimensionality P×T. Once $\theta_{tr}$ and R are generated in the trend block 131, a matrix multiplication operation of $\theta_{tr}$ and R is performed. Then, a transpose layer transposes the last two dimensions of the resulting N×D×T matrix, generating a final trend matrix $V_{tr}$ which has the dimensionality N×T×D.

The matrix $\theta_{tr}$ renders interpretability to the trend block 131. Values from $\theta_{tr}$ specifically define the $0^{th}$, $1^{st}$, $2^{nd}$, . . . $P^{th}$ order trend for each sample N and feature dimension D. For example, when p=0, a flat trend (i.e., no upward/downward trend) is defined, which is equivalent to the level component in traditional time-series modeling nomenclature. Furthermore, level refers to the average value of the series.

Turning to FIG. 3B, an illustrative block diagram of a seasonality block 132n is depicted. In this example, seasonality block 132n models cyclical patterns that optionally repeat over a certain period (e.g., hourly, daily, weekly, monthly, quarterly, arising around events such as holidays, weather events, or the like). For the following explanation of the functionality of the seasonality block 132n, S refers to the number of different seasonality patterns to be modeled. Each seasonality pattern, indexed by j, is defined by two parameters: m as the number of seasons and d as the duration of each season. For example, to represent day-of-the-week seasonality for daily data, m is 7 and d is 1. On the other hand, for hourly level data, day-of-the-week seasonality is modeled with m equal to 7 and d equal to 24.

For each seasonality pattern j, the TimeVAE 100' performs two steps. First, the sampled latent space vector z is used to estimate the matrix of basis expansion coefficients $$\theta_{sn}^{j}$$

which is shaped to have a dimensionality N×D×m by utilizing one or more fully-connected (dense) linear layers and a reshaping layer. The method proceeds by indexing the elements in $$\theta_{sn}^{j}$$

corresponding to a specific season for each time-step of X to retrieve the seasonal pattern values $$V_{sn}^{j}$$

which is of shape N×T×D. In embodiments, a gather function (e.g., as provided in TensorFlow™) may be used to perform the aforementioned indexing using a season indexing array K. The final seasonality estimates $V_{sn}$ are the element-wise summation of all $$V_{sn}^{j}$$

over j=1, 2, . . . , S.

Moreover, in the $j^{th}$ seasonality block 132n, the matrix $$\theta_{sn}^{j}$$

provides interpretability of the seasonal pattern for each sample N and feature dimension D. In embodiments, a user may query select seasonality blocks 132n by indexing elements in $$\theta_{sn}^{j}$$

to identify the impact of each of the m seasons within the seasonal cycle.

It is understood that the described architecture of the trend block 131 and the seasonality block 132n is an example. Embodiments of the trend block 131 and the seasonality block 132n may include variations to enable specific temporal structures and/or enable learning of temporal patterns from the real-world data input to the TimeVAE 100'.

Still referring to the decoder 130 of the TimeVAE 100', in some embodiments, the decoder 130 may also include a base decoder 120 as a residual branch in the decoder 130.

The interpretable architecture of the TimeVAE 100' may include programmable variables that enable a user to enable and disable select blocks 120, 131, 132a-132n of the decoder 130. For example, to disable a selected block of the plurality of blocks 120, 131, 132a-132n, the programmable variables may be configured to zero out the output of select blocks such that the output of the block is not added to the final output. In some aspects, a mask may be applied to the output of the temporal structure processing blocks in order to implement a selection of only certain blocks' output for further processing. In some examples, these may be set via an interface to parameters of the TimeVAE 100' provided by a computing device 402 or server 403, as described in more detail herein. In other examples, this may be set by a configuration file, or fixed in the architecture for a certain model deployment.

The final output from the interpretable decoder 130 in this example is the element-wise summation of the output $V_{tr}$ from the trend block 131, outputs $$V_{sn}^{j}$$

for j=1, 2, . . . , S from the seasonality blocks 132n, and the output from the residual base decoder 120.

The general architecture of the TimeVAE 100' has been described with reference to FIGS. 1-3B. The following describes the training of the TimeVAE 100' and the use of the TimeVAE 100' as a data generator.

Training a TimeVAE

Generally, TimeVAE 100' may be trained using different types of loss functions. In some embodiments, the TimeVAE 100' is trained using the ELBO loss function but modified using a weight on the reconstruction error, which operates to increase or decrease the emphasis placed on the reconstruction loss compared to the KL-Divergence loss between approximated posterior $q_\theta(z|x)$ and the prior $p_\theta(z)$. Based on experimentation, the weight factor on reconstruction error may be a value in the range between 0.5 and 3.5. However, the weighting factor may not be limited to the aforementioned range. The weighting factor may be chosen in response to manual inspection of the generated samples or through hyper-parameter tuning if the generated samples are used in a supervised learning task in a downstream application.

During the training process, encoder 110 receives a plurality of data. The plurality of data includes real-world or synthetically generated time-series data. The plurality of data may be in the form of an input signal X comprising a 3-dimensional array of size N×T×D, where N is batch size, T is a number of time steps, and D is a number of feature dimensions. The encoder 110 generates a multivariate distribution, and a sampler 115 samples the multivariate distribution forming a latent space vector z. The decoder 130 processes the latent space vector z.

The decoder 130 includes one or more blocks that have been initialized to learn one or more temporal structures from the received plurality of data (e.g., temporal structure processing blocks as described above). For example, the decoder 130 may be initialized with a trend block 131 and one or more seasonality blocks 132n. Training the trend block 131 and the one or more seasonality blocks 132n may be accomplished through a variety of approaches. One approach includes utilizing subject matter expert knowledge to pick an initial set of trends and/or seasonal patterns that may be present in the data. Once the trend block 131 and the one or more seasonality blocks 132n are initialized with anticipated patterns, the training process optimizes the temporal structures expressed by the trend block 131 and the one or more seasonality blocks 132n. Similar to the first approach, another approach may include utilizing statistical analysis of the plurality of data. For example, statistical processes can be utilized to detect cyclical patterns in the plurality of data so that the trend block 131 and the one or more seasonality blocks 132n are initialized with anticipated patterns based on the statistical analysis of the plurality of data. A further approach includes initializing a trend block 131 and a plurality of seasonality blocks 132n where each is directed to one of a variety of different temporal structures. That is, as the training process is performed, hyper-parameter tuning dials up or down the strength of the seasonality blocks 132n that correspond to temporal structures present in the plurality of data.

The training process further includes comparing multivariate time series data generated by the decoder 130 with the plurality of data to determine a reconstruction error. The determined reconstruction error is then backpropagated to update the VAE.

Once the TimeVAE 100' is trained, the encoder 110 may be disconnected from the architecture so that the TimeVAE 100' operates as a standalone data generator. As a generator, the TimeVAE 100' includes sampling, with a sampler 115, the multivariate distribution forming a latent space vector z. The decoder 130 processes the latent space vector z. The temporal structures implemented by one or more blocks of the plurality of blocks of the decoder 130 inject temporal structures into the multivariate time series data generated by the decoder 130. The decoder 130 then outputs multivariate time series data comprising one or more temporal structures defined by the injected one or more temporal structures. In some embodiments, the plurality of blocks 120, 131, 132a-132n is configured in a parallel architecture where the outputs from each block are added together to produce the final output. Furthermore, a user may selectively enable or disable particular blocks 120, 131, 132a-132n of the decoder 130. Enabling and disabling particular blocks 120, 131, 132a-132n of the decoder 130 may be accomplished, for example, by assigning or setting a weighting value associated with the output of the particular block that is desirous to enable (e.g., weight set to 1) or disable (e.g., weight set to 0). Outputs, multivariate time series data generated by the decoder 130, may be utilized to train other machine learning models (e.g., deep learning models) or other downstream tasks such as making predictions, forecasting, classifying, and/or testing models.

Example Method for Generating Multivariate Time Series Data with a TimeVAE

Figure 4:
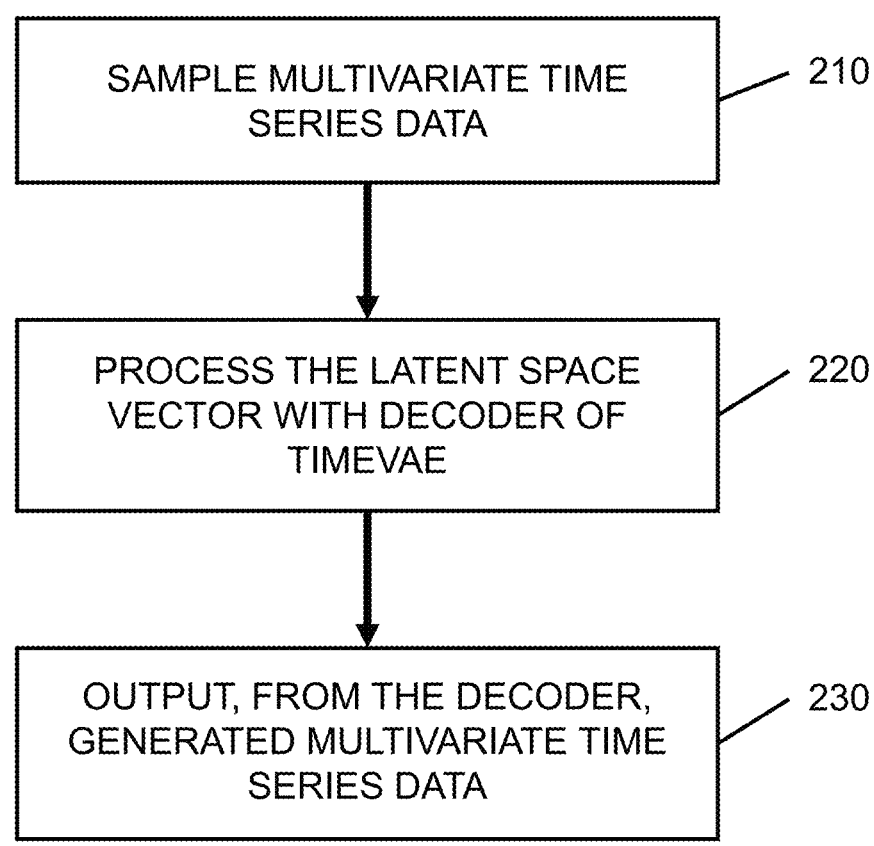
FIG. 4 depicts an illustrative flowchart for an example method for generating multivariate time series data with a TimeVAE according to one or more embodiments shown and described herein.

FIG. 4 depicts an example method 200 for generating multivariate time series data, according to certain embodiments.

In this example, method 200 begins at step 210 with sampling a multivariate distribution forming a latent space vector. For example, step 210 may be performed by the sampler 115 as described above with reference to FIGS. 1 and 2.

Method 200 then proceeds to step 220 with processing the latent space vector with an interpretable decoder 130 of a variational auto-encoder (e.g., a TimeVAE 100'), an architecture of the interpretable decoder 130 comprising a plurality of blocks including one or more blocks configured to inject one or more temporal structures into multivariate time series data. For example, step 220 may be performed by one or more of the blocks 120, 131, 132a-132n of the decoder 130 as described above with reference to FIG. 2.

Method 200 then proceeds to step 230 with outputting, from the interpretable decoder 130, generated multivariate time series data comprising one or more temporal structures defined by the injected one or more temporal structures. For example, step 230 may be performed by the decoder 130 of the TimeVAE 100' as described above with reference to FIG. 2.

In some embodiments of method 200, the plurality of blocks are configured to be selectively enabled or disabled, and outputs from each enabled block of the plurality of blocks are added together to generate the multivariate time series data.

In some embodiments of method 200, at least one of the one or more blocks is a trend block, the trend block defines a monotonic function, and when the trend block is enabled, the trend block imparts a monotonic temporal structure in the generated multivariate time series data.

In some embodiments of method 200, at least one of the one or more blocks is a seasonality block, and the seasonality block defines a seasonal pattern parametrized at least by a number of seasons where each season has a predefined duration.

In some embodiments of method 200, the one or more blocks comprise a trend block and two or more seasonality blocks, and a first seasonality block is distinct from a second seasonality block of the two or more seasonality blocks.

In some embodiments of method 200, the latent space vector comprises a length equivalent to a dimensional size of the multivariate distribution.

In some embodiments of method 200, the plurality of blocks is configured as parallel blocks such that outputs from each of the plurality of blocks are added together to generate the multivariate time series data.

In some embodiments, method 200 further includes encoding, with an encoder 110 of the variational auto-encoder (e.g., the TimeVAE 100'), a signal comprising a 3-dimensional array of size N×T×D, where N is batch size, T is a number of time steps, and D is a number of feature dimensions forming the multivariate distribution.

Note that FIG. 4 is just one example of a method, and other methods, including fewer, additional, or alternative steps, are possible consistent with this disclosure.

Example Method for Training a TimeVAE

FIG. 5 depicts an example method 300 for training a variational auto-encoder (e.g., TimeVAE 100') for generating multivariate time series, according to certain embodiments.

Method 300 begins at step 310 with inputting a plurality of data into an encoder of the variational auto-encoder. For example, step 310 may be performed by encoder 110 of the TimeVAE 100' as described above with reference to FIGS. 1 and 2. Furthermore, the method may be implemented by the computing device 402 and/or server 403 as described with reference to FIG. 6.

Method 300 then proceeds to step 320 with generating a multivariate distribution with the encoder. For example, step 310 may be performed by encoder 110 as described above with reference to FIGS. 1 and 2.

Method 300 then proceeds to step 330 with sampling the multivariate distribution forming a latent space vector. For example, step 330 may be performed by the sampler 115 as described above with reference to FIGS. 1 and 2.

Method 300 then proceeds to step 340 with processing the latent space vector with an interpretable decoder of the variational auto-encoder, wherein an architecture of the interpretable decoder comprises a plurality of blocks, including one or more trainable temporal blocks configured to learn temporal structures in the sampled multivariate distribution. For example, step 340 may be performed by one or more of the blocks 120, 131, 132a-132n of the decoder 130 as described above with reference to FIG. 2.

Method 300 then proceeds to step 350 with outputting, from the interpretable decoder, a generated multivariate time series data. For example, step 350 may be performed by the decoder 130 of the TimeVAE 100' as described above with reference to FIG. 2.

Method 300 then proceeds to step 360 with comparing the generated multivariate time series data with the plurality of data to determine a reconstruction error. For example, step 360 may be performed by the computing device 402 and/or server 403 that is configured to implement the TimeVAE 100' as described with reference to FIG. 6.

Method 300 then proceeds to step 320 with backpropagating the determined reconstruction error to update the variational auto-encoder. For example, step 360 may be performed by the computing device 402 and/or server 403 that is configured to implement the TimeVAE 100' as described with reference to FIG. 6.

In some embodiments of method 300, at least one of the one or more trainable temporal blocks is a trend block, and the trend block learns a monotonic function.

In some embodiments of method 300, at least one of the one or more trainable temporal blocks is a seasonality block, and the seasonality block learns a seasonal pattern parametrized by a number of seasons where each season has a predefined duration.

In some embodiments of method 300, an initial instance of the seasonality block is predefined based on at least one of an expected seasonal trend or a statistically determined cyclical pattern within the plurality of data.

In some embodiments of method 300, the plurality of blocks includes a plurality of seasonality blocks, and each of the plurality of seasonality blocks is distinct such that during training, hyperparameter tuning increases or decreases the strength of particular ones of the plurality of seasonality blocks that correspond to patterns within the plurality of data.

Note that FIG. 5 is just one example of a method, and other methods, including fewer, additional, or alternative steps, are possible consistent with this disclosure.

Example System for Processing with a TimeVAE

Figure 6:
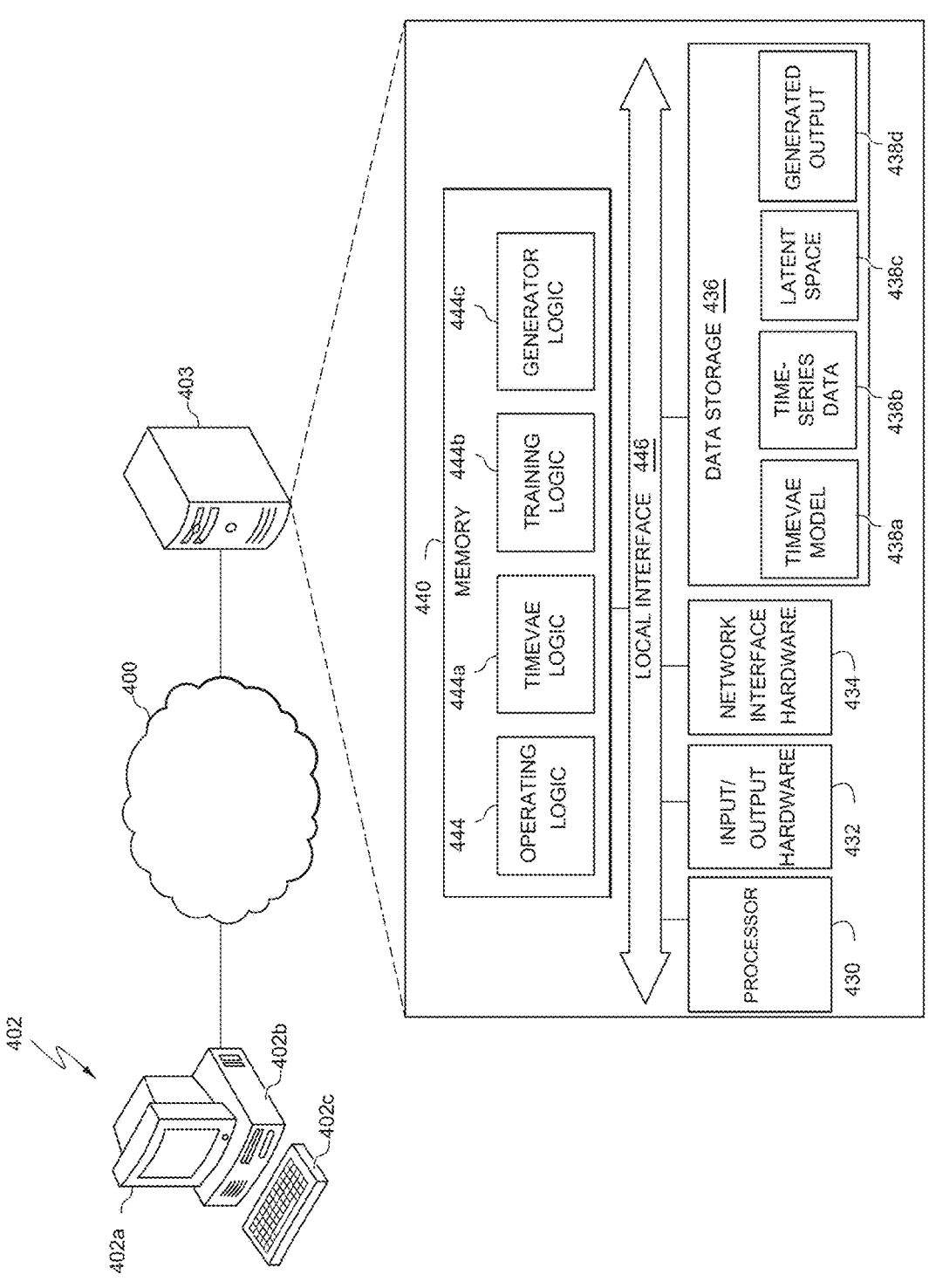
FIG. 6 depicts schematically depicts an example computing network and computing device for implementing the interpretable TimeVAE according to one or more embodiments shown and described herein.

Turning to FIG. 6, an illustrative system diagram of a computing system and computing device for implementing embodiments of the TimeVAE 100', as depicted and described above with respect to FIGS. 1-3B. A computing device 402 and/or a server 403 may be configured to implement embodiments of the TimeVAE 100' and/or to implement the methods depicted and described with respect to FIGS. 4-5, and others described herein. In some embodiments, a graphic processing unit (GPU) or a tensor processing unit (TPU) may be implemented for implementing embodiments of the TimeVAE 100', as depicted and described above with respect to FIGS. 1-3B.

As illustrated in FIG. 6, a network 400 may include a wide area network, such as the internet, a local area network (LAN), a mobile communications network, a public service telephone network (PSTN), and/or other network and may be configured to electronically and/or communicatively connect a computing device 402 to a server 403 and other devices.

The computing device 402 may include a display 402a, a processing unit 402b, and an input device 402c, each of which may be communicatively coupled together and/or to the network 400. The computing device 402 may be used as a terminal to interact with the TimeVAE 100', such as enable or disable blocks of the decoder, execute training of the TimeVAE 100', or the like. In embodiments, the TimeVAE 100' may be deployed and operate on a server 403. The server 403 may be configured as a data storage device to maintain training data and/or generate multivariate time series data output by the decoder 130 of the TimeVAE 100'.

It should be understood that the computing device 402 and the server 403 are merely examples. More specifically, in some embodiments, any type of computing device (e.g., mobile computing device, personal computer, server, and the like) may be utilized for any of these components. Additionally, while each of these computing devices is illustrated in FIG. 6 as a single piece of hardware, this is also an example. More specifically, each of the depicted components may represent a plurality of computers, servers, databases, and the like. For example, each of the computing device 402, the server 403, and/or other computing devices may form a distributed or grid-computing framework for implementing the methods described herein.

FIG. 6 further depicts illustrative aspects of the server 403 implementing the TimeVAE 100'. The server 403 may utilize hardware, software, and/or firmware, according to embodiments shown and described herein. While in some embodiments, the server 403 may be configured as a general-purpose computer with the requisite hardware, software, and/or firmware, in some embodiments, the server 403 may be configured as a special purpose computer designed specifically for performing the functionality described herein.

The server 403 may include a processor 430, input/output hardware 432, network interface hardware 434, a data storage component 436, which stores a TimeVAE model 438a (e.g., TimeVAE 100') as described herein, time-series data 438b, latent space 438c generated by the encoder of the TimeVAE 100', and generated outputs 438d from the Time-VAE 100', and a memory component 440. The memory component 440 may be machine-readable memory (which may also be referred to as a non-transitory processor-readable memory). The memory component 440 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 440 may be configured to store operating logic 442 and logic 444a for implementing TimeVAE 100', a training logic 444b configured to train the TimeVAE 100', and generator logic 444c defining the implementation of the TimeVAE 100' as a generator of multivariate time series data having one or more temporal structures defined by the injected one or more temporal structures (each of which may be embodied as a non-transitory computer-readable medium storing computer readable instructions, a computer program, firmware, or hardware, as an example).

A local interface 446 is also included in FIG. 6 and may be implemented as a bus or other interface to facilitate communication among the components of the server 403.

The processor 430 may include any processing component(s) configured to receive and execute programming instructions (such as from the data storage component 436 and/or the memory component 440). In some embodiments, the processor 430 may include machine-learning accelerator components for optimizing training and/or inferencing. The instructions may be in the form of a machine-readable instruction set stored in the data storage component 436 and/or the memory component 440. The input/output hardware 432 may include a monitor, keyboard, mouse, printer, camera, microphone, speaker, and/or other devices for receiving, sending, and/or presenting data. The network interface hardware 434 may include any wired or wireless networking hardware, such as a modem, LAN port, Wi-Fi card, WiMax card, mobile communications hardware, and/or other hardware for communicating with other networks and/or devices.

It should be understood that the data storage component 436 may reside locally to and/or remote from the server 403 and may be configured to store one or more pieces of data for access by the server 403 and/or other components. As illustrated in FIG. 6, the data storage component 436 stores a TimeVAE model 438a (e.g., TimeVAE 100' as described herein). The TimeVAE model 438a stored in the data storage component 436 includes functions for implementing the encoder 110, sampler 115, and/or the decoder 130. The data storage component 436 further includes a plurality of time-series data 438b, including, for example, data for training the TimeVAE 100'. The data storage component 436 further includes data representing the latent space 438c of the TimeVAE 100' and the generated output 438d, for example, the final output X̂ such as multivariate time series data having one or more temporal structures defined by the injected one or more temporal structures.

In some embodiments, server 403 may be configured to train a TimeVAE 100' and thereafter deploy it to a remote processing device, such as computing device 402.

It should be understood that embodiments of the Time-VAE 100' disclosed herein are interpretable, have the ability to encode domain knowledge, and are capable of being trained in less time and on smaller amounts of data while maintaining and/or exceeding the performance of other data generation methods.

EXAMPLE CLAUSES

Implementation examples are described in the following numbered clauses:

Clause 1: A method for generating multivariate time series data, the method comprising: sampling a multivariate distribution forming a latent space vector; processing the latent space vector with an interpretable decoder of a variational auto-encoder, an architecture of the interpretable decoder comprising a plurality of blocks including one or more blocks configured to inject one or more temporal structures into multivariate time series data; and outputting, from the interpretable decoder, generated multivariate time series data comprising one or more temporal structures defined by the injected one or more temporal structures.

Clause 2: The method of Clause 1, wherein: the plurality of blocks are configured to be selectively enabled or disabled, and outputs from each enabled block of the plurality of blocks are added together to generate the multivariate time series data.

Clause 3: The method of any one of Clauses 1-2, wherein: at least one of the one or more blocks is a trend block, the trend block defines a monotonic function, and when the trend block is enabled, the trend block imparts a monotonic temporal structure in the generated multivariate time series data.

Clause 4: The method of any one of Clauses 1-3, wherein: at least one of the one or more blocks is a seasonality block, and the seasonality block defines a seasonal pattern parametrized at least by a number of seasons where each season has a predefined duration.

Clause 5: The method of any one of Clauses 1-4, wherein: the one or more blocks comprise a trend block and two or more seasonality blocks, and a first seasonality block is distinct from a second seasonality block of the two or more seasonality blocks.

Clause 6: The method of any one of Clauses 1-5, wherein the latent space vector comprises a length equivalent to a dimensional size of the multivariate distribution.

Clause 7: The method of any one of Clauses 1-6, wherein the plurality of blocks are configured as parallel blocks such that outputs from each of the plurality of blocks are added together to generate the multivariate time series data.

Clause 8: The method of any one of Clauses 1-7, further comprising encoding, with an encoder of the variational auto-encoder, a signal comprising a 3-dimensional array of size N×T×D, where N is a batch size, T is a number of time steps, and D is a number of feature dimensions forming the multivariate distribution.

Clause 9: A method of training a variational auto-encoder for generating multivariate time series da-ta, the method comprising: inputting a plurality of data into an encoder of the variational auto-encoder; generating a multivariate distribution with the encoder; sampling the multivariate distribution forming a latent space vector; processing the latent space vector with an interpretable decoder of the variational auto-encoder, wherein an architecture of the interpretable decoder comprises a plurality of blocks including one or more trainable temporal blocks configured to learn temporal structures in the sampled multivariate distribution; outputting, from the interpretable decoder, a generated multivariate time series data; comparing the generated multivariate time series data with the plurality of data to determine a reconstruction error; and backpropagating the determined reconstruction error to update the variational auto-encoder.

Clause 10: The method of Clause 9, wherein at least one of the one or more trainable temporal blocks is a trend block, the trend block learns a monotonic function.

Clause 11: The method of any one of Clauses 9-10, wherein: at least one of the one or more trainable temporal blocks is a seasonality block, and the seasonality block learns a seasonal pattern parametrized by a number of sea-sons where each season has a predefined duration.

Clause 12: The method of Clause 11, wherein an initial instance of the seasonality block is predefined based on at least one of an expected seasonal trend or a statistically determined cyclical pattern within the plurality of data.

Clause 13: The method of any one of Clauses 9-12, wherein: the plurality of blocks includes a plurality of seasonality blocks, and each of the plurality of seasonality blocks is distinct such that during training hyperparameter tuning increases or decreases a strength of particular ones of the plurality of seasonality blocks that correspond to patterns within the plurality of data.

Clause 14: A processing system, comprising: a memory comprising computer-executable instructions; and a processor configured to execute the computer-executable instructions and cause the processing system to perform a method in accordance with any one of Clauses 1-13.

Clause 15: A processing system, comprising means for performing a method in accordance with any one of Clauses 1-13.

Clause 16: A non-transitory computer-readable medium comprising computer-executable instructions that, when executed by a processor of a processing system, cause the processing system to perform a method in accordance with any one of Clauses 1-13.

Clause 17: A computer program product embodied on a computer-readable storage medium comprising code for performing a method in accordance with any one of Clauses 1-13.

Additional Considerations

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It will be apparent to those skilled in the art that various modifications and variations can be made in the present disclosure without departing from the spirit or scope of the disclosure. Thus, it is intended that the present disclosure cover the modifications and variations of this disclosure, provided they come within the scope of the appended claims and their equivalents.

While various embodiments of the present disclosure have been described above, it should be understood that they have been presented by way of example only and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments, but should be defined only in accordance with the following claims and their equivalents.

What is claimed is:

1. A method for generating multivariate time series data, the method comprising:

sampling a multivariate distribution forming a latent space vector;

processing the sampled latent space vector with an interpretable decoder of a variational auto-encoder, an architecture of the interpretable decoder comprising a plurality of blocks including one or more temporal structure processing blocks and a base decoder block, wherein the plurality of blocks are configured to inject one or more temporal structures into multivariate time series data, and wherein the base decoder block is configured as one or more convolutional neural networks comprising a fully-connected linear layer, a reshaping layer, and a series of transposed convolutional layers; and outputting, from the interpretable decoder, generated multivariate time series data comprising the one or more temporal structures defined by the injected one or more temporal structures.

2. The method of claim 1, wherein:

the plurality of blocks are configured to be selectively enabled or disabled, and outputs from each enabled block of the plurality of blocks are added together to generate the multivariate time series data.

3. The method of claim 1, wherein:

at least one of the one or more temporal structure processing blocks is a trend block, the trend block defines a monotonic function and the trend block comprises one or more fully-connected linear layers, a reshaping operation, and a trend reconstruction, and when the trend block is enabled, the trend block imparts a monotonic temporal structure in the generated multivariate time series data.

4. The method of claim 1, wherein:

at least one of the one or more temporal structure processing blocks is a seasonality block, the seasonality block defines a seasonal pattern parametrized at least by a number of seasons where each season has a predefined duration, and the seasonal pattern is based on one or more elements of a matrix of basis expansion coefficients and one or more corresponding seasonal pattern values for the one or more elements.

5. The method of claim 1, wherein:

the one or more temporal structure processing blocks comprise a trend block and two or more seasonality blocks, and a first seasonality block is distinct from a second seasonality block of the two or more seasonality blocks.

6. The method of claim 1, wherein the sampled latent space vector comprises a length equivalent to a dimensional size of the multivariate distribution.

7. The method of claim 1, wherein the plurality of blocks are configured as parallel blocks such that outputs from each of the plurality of blocks are added together to generate the multivariate time series data.

8. The method of claim 1, further comprising encoding, with an encoder of the variational auto-encoder, a signal comprising a 3-dimensional array of size N×T×D, where N is a batch size, T is a number of time steps, and D is a number of feature dimensions forming the multivariate distribution, wherein the encoder is configured as one or more convolutional neural networks.

9. A computer-implemented system for generating multivariate time series data, the computer-implemented system comprising:

a processor and a non-transitory computer-readable medium storing computer readable instructions that, when executed by the processor, cause the system to:

sample a multivariate distribution forming a latent space vector;

process the sampled latent space vector with an interpretable decoder of a variational auto-encoder, an architecture of the interpretable decoder comprising a plurality of blocks including one or more temporal structure processing blocks and a base decoder block, wherein the plurality of blocks are configured to inject one or more temporal structures into a multivariate time series data, and wherein the base decoder block is configured as one or more convolutional neural networks comprising a fully-connected linear layer, a reshaping layer, and a series of transposed convolutional layers; and output, from the interpretable decoder, generated multivariate time series data comprising one or more temporal structures defined by the injected one or more temporal structures.

10. The computer-implemented system of claim 9, wherein:

at least one of the one or more temporal structure processing blocks is a trend block, the trend block defines a monotonic function and the trend block comprises one or more fully-connected linear layers, a reshaping operation, and a trend reconstruction, and when the trend block is enabled, the trend block imparts a monotonic temporal structure in the generated multivariate time series data.

11. The computer-implemented system of claim 9, wherein:

at least one of the one or more temporal structure processing blocks is a seasonality block, the seasonality block defines a seasonal pattern parametrized by a number of seasons where each season has a predefined duration, and the seasonal pattern is based on one or more elements of a matrix of basis expansion coefficients and one or more corresponding seasonal pattern values for the one or more elements.

12. The computer-implemented system of claim 9, wherein:

at least one of the one or more temporal structure processing blocks is a concept drift block, and the concept drift block defines a context shift in the multivariate time series data as a predefined shift in a mean or standard deviation of the multivariate time series data.

13. The computer-implemented system of claim 9, wherein:

the one or more temporal structure processing blocks comprise a trend block and two or more seasonality blocks, and a first seasonality block is distinct from a second seasonality block of the two or more seasonality blocks.

14. The computer-implemented system of claim 9, wherein the sampled latent space vector comprises a length equivalent to a dimensional size of the multivariate distribution.

15. The computer-implemented system of claim 9, wherein the plurality of blocks are configured as parallel blocks such that outputs from each of the plurality of blocks are added together to generate the multivariate time series data.

16. A method of training a variational auto-encoder for generating multivariate time series data, the method comprising:

inputting a plurality of data into an encoder of the variational auto-encoder, wherein the encoder is configured as one or more convolutional neural networks;

generating a multivariate distribution with the encoder;

sampling the multivariate distribution forming a latent space vector;

processing the sampled latent space vector with an interpretable decoder of the variational auto-encoder, wherein an architecture of the interpretable decoder comprises a plurality of blocks including one or more trainable temporal structure processing blocks and a base decoder block, wherein the plurality of blocks are configured to learn temporal structures in the sampled multivariate distribution, and wherein the base decoder block is configured as one or more convolutional neural networks comprising a fully-connected linear layer, a reshaping layer, and a series of transposed convolutional layers;

outputting, from the interpretable decoder, a generated multivariate time series data;

comparing the generated multivariate time series data with the plurality of data to determine a reconstruction error; and backpropagating the determined reconstruction error to update the variational auto-encoder.

17. The method of claim 16, wherein the at least one of the one or more trainable temporal structure processing blocks is a trend block, the trend block learns a monotonic function and the trend block comprises one or more fully-connected linear layers, a reshaping operation, and a trend reconstruction.

18. The method of claim 16, wherein:

at least one of the one or more trainable temporal structure processing blocks is a seasonality block, the seasonality block learns a seasonal pattern parametrized at least by a number of seasons where each season has a predefined duration, and the seasonal pattern is based on one or more elements of a matrix of basis expansion coefficients and one or more corresponding seasonal pattern values for the one or more elements.

19. The method of claim 18, wherein an initial instance of the seasonality block is predefined based on at least one of an expected seasonal trend or a statistically determined cyclical pattern within the plurality of data.

20. The method of claim 16, wherein:

the plurality of blocks includes a plurality of seasonality blocks, and each of the plurality of seasonality blocks is distinct such that during training hyperparameter tuning increases or decreases a strength of particular ones of the plurality of seasonality blocks that correspond to patterns within the plurality of data.

\* \* \* \* \*